United States Patent [19]

Williams, Jr. et al.

[11] 4,214,600
[45] Jul. 29, 1980

[54] VALVE

[75] Inventors: Leonard E. Williams, Jr.; William M. Taylor, both of Houston, Tex.

[73] Assignee: Cameron Iron Works, Inc., Houston, Tex.

[21] Appl. No.: 12,383

[22] Filed: Feb. 15, 1979

[51] Int. Cl.² .................... F16K 41/02; F16K 17/38
[52] U.S. Cl. ...................................... 137/72; 251/330
[58] Field of Search .................. 137/72, 74; 251/330, 251/214, 329

[56] References Cited

U.S. PATENT DOCUMENTS

| | | | |
|---|---|---|---|
| 2,647,721 | 8/1953 | Volpin | 137/72 |
| 3,177,887 | 4/1965 | Priese | 137/74 |
| 3,630,483 | 12/1971 | Canalizo | 137/72 X |
| 3,788,600 | 1/1974 | Allen | 251/214 |
| 3,842,853 | 10/1974 | Kelly et al. | 137/72 X |

Primary Examiner—Arnold Rosenthal
Attorney, Agent, or Firm—Vinson & Elkins

[57] ABSTRACT

A stem operated valve having a body and a bonnet secured to the body, a valve member movably positioned within the body, and a stem secured to the valve member and extending into the bonnet, a seat on the bonnet surrounding the stem, a shoulder on the stem adapted to engage the seat, a stem packing positioned outward of the stem shoulder and bonnet seat, a fusible material at the outer end of the bonnet and stem supporting the stem with its shoulder spaced from the bonnet seat during normal operations and holes in the bonnet through which the fusible material exits when the valve is exposed to fire whereby the stem shoulder engages the bonnet seat to seal around the stem.

11 Claims, 2 Drawing Figures

VALVE

BACKGROUND OF THE INVENTION

Efforts have been made in the past to include fusible elements in stem operated valves so that leakage around the stem could be prevented by a metal-to-metal stem seal when the valve was subjected to fire. The H. Allen U.S. Pat. No. 3,788,600, the A. S. Volpin U.S. Pat. No. 2,647,721 and the W. M. Kelly et al U.S. Pat. No. 3,842,853 are examples of such prior structures.

The Allen Patent discloses a gate valve with a two-piece stem, the outer section of which telescopes with respect to the inner section. The outer section has a metal sealing shoulder which is held apart from a metal seat, located in the cap, by a fusible member. In the event of a fire, a metal-to-metal seal is formed between the stem shoulder and cap seat. This will effectively contain the line fluid; however, the cap must be made excessively large since it will be exposed to the high pressure of the line fluid.

The A. S. Volpin Patent discloses a valve with a fusible element supporting the bearing so that a shoulder on the stem engages a seat on the interior of the bonnet when the fusible element melts due to fire. This structure positions the stem packing on the outer end of the stem where it is more subject to heat than the fusible element and could fail before the fusible element to allow escape of fluids around the stem which are flowing through the valve and which fluids may feed the fire or complicate the fire fighting. Further, Volpin makes no provision for draining the melted material from the bonnet. Also, Volpin, as does Allen, requires the cap to be strong enough to contain the high pressure line fluid.

The W. M. Kelly et al Patent discloses a heat responsive safety valve in which the gate is held in open position by fusible material at the outer end of the stem retaining the stem from axial movement. The occurrence of a fire melts the fusible material and responsive to a spring load the stem and gate move to close passage through the valve. There is no provision for a metal-to-metal sealing around the stem inward of the O-ring stem seal. Failure of such O-ring seal could lead to the leakage of fluids from the valve around the stem even though the gate had moved to closed position.

SUMMARY

The present invention relates to an improved fire safe, stem-operated valve.

The improved valve of the present invention includes a rotating stem for actuation of the valve member with a fusible element supporting the stem bearing at the outer portion of the stem so that the stem moves axially when the fusible element melts to bring a stem shoulder into sealing engagement with a seat in the bonnet and thereby prevent stem leakage even though the stem packing is destroyed by the heat.

An object of the present invention is to provide an improved valve which provides a metal-to-metal stem seal responsive to the excessive heat of a fire before the stem packing starts to leak because of such heat.

Another object is to provide an improved fire safe valve having a fusible element which can be easily checked for compressive stress failure and creep.

A further object is to provide an improved fire safe valve which assures that the fusible element melts before the stem packing fails responsive to excessive heat.

Still another object is to provide an improved fire safe valve with a fusible element therein and having provision for draining the melted fusible element from the interior of the valve.

BRIEF DESCRIPTION OF THE DRAWINGS

These and other objects and advantages of the present invention are hereinafter set forth and explained with respect to the drawings wherein.

DESCRIPTION OF THE PREFERRED EMBODIMENT

Figure 1:
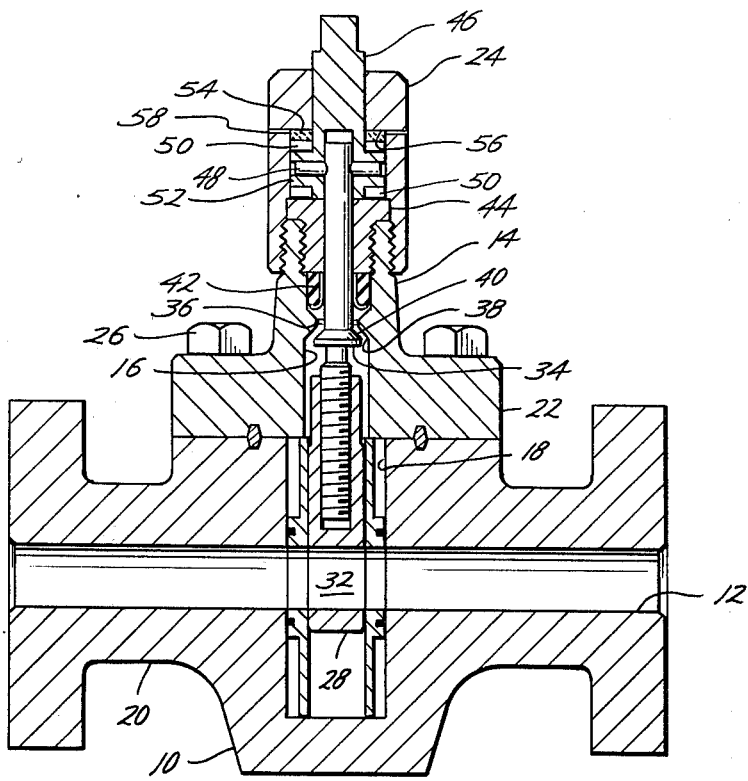
FIG. 1 is an elevation view of the improved valve of the present invention with portions shown in section to illustrate the components.

The improved valve of the present invention includes housing 10 which has flow passage 12 extending therethrough and tubular extension 14 extending transversely to flow passage 12 and with bore 16 which terminates in chamber 18. As shown in FIG. 1, chamber 18 intersects flow passage 12. Housing 10 includes body 20 and tubular extension 14 which includes bonnet 22 and cap 24. Bonnet 22 is secured to body 20 by suitable securing means such as bolts 26 and cap 24 is threaded onto the outer end of bonnet 22.

A closure member, such as gate 28, is positioned in chamber 18 and adapted to be operated or moved by the rotation of stem 30 from a position in which port 32 through gate 28 is in registry with flow passage 12 to a position blocking flow through flow passage 12.

Shoulder 34 provides a stop to properly position the gate 28 relative to flow passage 12. Bonnet 22 includes upper tubular extension 14 having projection 36 in bore 16 to provide seat 38. Stem 30 has a shoulder 40 capable of engaging and sealing against seat 38. Packing 42 provides a seal between stem 30 and the interior of tubular extension 14. Nut 44 is threaded into the upper end of extension 14 to retain packing 42.

Adapter 46 is partly positioned in cap 24 and is secured to the outer end of stem 30 by pin 48 so that rotation of adapter 46 rotates stem 30. Adapter 46 extends through the outer end of cap 24 and is provided with a suitable shape for rotation by a suitable device. Bearing means such a roller bearings 50 are provided to position adapter 46 within cap 24 by engaging annular flange 52 on adapter 46. As hereinafter explained, bearings 50 are free to move in the bore of cap 24.

Fusible material 54 is positioned against shoulder 56 in cap 24 to support bearings 50. Such fusible material is preferably a eutectic metal having a melting point sufficiently above normal ambient temperatures to provide adequate support for bearings 50 under all normal conditions and yet melt promptly when the valve is exposed to fire. When material 54 melts it is drained or otherwise expelled from within cap 24 to the outside through drain holes 58 to assure that the material does not become trapped and continue to maintain support for bearings 50. This assures that stem 30, bearings 50 and adapter 46 are free to move axially to provide the metal-to-metal stem seal of shoulder 40 on seat 38. The pressure within chamber 18 acts on the stem to urge it outward into such stem sealed position.

Figure 2:
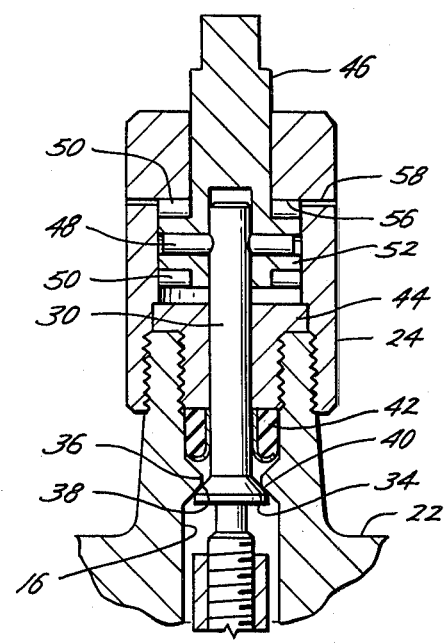
FIG. 2 is a detailed sectional view showing the stem seal responsive to a fire.

This outward position of stem 30 is llustrated in FIG. 2. Material 54 has melted and exited through drain holes 58 and stem 30 has been forced outwardly by fluid pressure within chamber 18 to seat shoulder 40 on seat 38. This prevents leakage of fluids flowing through flow passage 12 around stem 30 when packing 30 is destroyed or damaged by excessive heat.

Fusible material 54 is positioned in the outer part of the valve structure, i.e., immediately within cap 24, so that it melts quickly when the valve is subjected to fire. With the material in this outer position, the mass of the body and the flow of fluids therethrough do not act as a heat sink to delay its melting. Further, it is relatively simple to check meterial 54 to be sure it has not been deformed as a result of compressive stress or creep. Also, if material 54 is such that it creeps under the standard size of bearings 50 and cap 24, the compressive stress may be reduced by merely changing the size of material 54 and cap 24 and providing a bearing washer to transmit the load from the bearings 50 to material 54. Prior structures, such as shown in the Volpin Patent previously mentioned, would require extensive body modification to reduce the compressive stress on fusible material. Another advantage of this placement of material 54 is that it is protected by packing 42 from the fluids flowing through flow passage 12. Fluids which include sour gas or hydrogen sulfide in any form normally attack the generally used fusible alloys.

The invention is, of course, applicable to valves having a stem operator, such as plug valves.

What is claimed is:

1. A valve, comprising
    a body having a chamber open on the top and a passage extending through the body and in communication with the chamber,
    a valve member movable in the chamber to open and close flow through said passage,
    a bonnet having a central bore with a seat facing downward within said bore,
    means securing the bonnet to the body around the chamber opening,
    a stem extending through said bonnet bore and threadedly engaging said valve member,
    an upwardly facing shoulder on the stem being normally in spaced relationship to said seat,
    bearing means between the stem and the bonnet,
    packing means sealing between the stem and the bonnet at a position between the seat and said bearing means,
    a fusible element positioned in supporting relationship to said bearing means and normally retaining the stem shoulder spaced from the bonnet seat,
    said fusible element being adapted, when heated, to relax its support of said bearing means so that the stem shoulder seats on the bonnet seat to prevent leakage around the stem whereby failure of said packing means as a result of heat does not result in fluid leakage around the stem.

2. A valve according to claim 1 including
    means for draining melted fusible element away from its bearing supporting position.

3. A valve according to claim 1 including
    a cap connected to said bonnet,
    said cap having said fusible element positioned therein.

4. A valve according to claim 3 including
    a stem adapter secured to the outer end of said stem and extending through a hole in said cap.

5. A valve according to claim 4 wherein
    said stem adapter has an annular flange, and said bearing means includes a roller bearing positioned on each side of said annular flange around said stem adapter.

6. A gate valve, comprising
    a body having a chamber opening to the exterior of the body and a passage extending through the body and communicating with the chamber,
    a gate movable in said chamber to open and close flow through said passage,
    a bonnet secured to the body around said chamber opening and having a bore with an inwardly projecting seat facing the body,
    a stem threadedly engaging said gate, said stem extending through the bonnet bore and having a shoulder facing the bonnet seat and spaced therefrom in the direction toward the body a relative short distance,
    packing means sealing between the stem and the bonnet bore and spaced from the bonnet seat in a direction away from the body,
    bearing means surrounding the stem and positioned farther away from the body than said packing means,
    a cap threaded to the bonnet, and
    a fusible ring positioned within the cap is position for supporting the outer side of said bearing means when the cap is attached to the bonnet,
    said fusible ring being of sufficient thickness to support said bearing means to maintain the stem shoulder spaced from the bonnet seat and when it melts by exposure to heat to allow said shoulder to engage and seal on said seat, and
    the stem extending through the cap and having means secured thereto to rotate the stem whereby the gate is moved within the chamber.

7. A gate valve according to claim 6 including
    a drain hole extending through the cap in a position to drain melted fusible ring from the interior of the cap.

8. A gate valve according to claim 7 wherein said fusible ring is a eutectic metal alloy having a melting point sufficiently above the normal temperatures to which it is to be exposed in normal valve operations without having excessive creep or deformation from compressive stress at such temperatures and having a sufficiently low melting point to melt promptly when the valve is exposed to fire.

9. A gate valve according to claim 6, including
    a second shoulder on the stem to provide a stop for the gate to assure registry of the opening through the gate with the passage through the body.

10. A valve, comprising
    a housing having a flow passage therethrough and a generally tubular shaped extension transverse to the passageway, the bore of which terminates in a chamber intersecting the passageway,
    a closure member in the chamber,
    a stem in the bore for moving the closure member,
    a shoulder on the stem,
    a seat in the bore,
    sealing means in the bore between the stem and said extension outwardly of the seat in the bore,
    thrust bearing means in the bore outwardly of the sealing means,
    said bearing means being attached to the stem and slidable in the bore,
    an inwardly-facing shoulder in the housing outwardly of the bearing means, and a fusible element in the bore sandwiched between said inwardly-facing shoulder and the bearing means, said stem shoulder being normally spaced toward the closure member from said bore seat but sealingly engaging the bore seat upon melting of the fusible element, responsive to pressure in the chamber to prevent fluid flow outwardly around said stem.

11. A fire-safe stem-type operator for a valve, the body of the valve having a flow passageway therethrough, a chamber intersecting the passageway, and a closure member in the chamber, comprising a generally tubular-shaped extension for the body to extend laterally of the passageway, having a bore for communication with the chamber, a stem in the bore for moving the closure member, a shoulder on the stem, a seat in the bore, sealing means in the bore between the stem and said extension outwardly of the seat in the bore, thrust bearing means in the bore outwardly of the sealing means, said bearing means being attached to the stem and slidable in the bore, an inwardly-facing shoulder in the tubular extension outwardly of the bearing means, and a fusible element in the bore sandwiched between said inwardly-facing shoulder and the bearing means, said stem shoulder being normally spaced inwardly of said bore seat but moving to sealing engagement with the bore seat responsive to pressure in the chamber upon melting of the fusible element to prevent fluid flow outwardly around the stem.

* * * * *